US 6,576,872 B2
Jun. 10, 2003

(12) United States Patent
Bertero

(54) OVEN FOR CONTINUOUS CURING OF A SUCCESSION OF PRE-FORMED ELASTOMER ARTICLES, IN PARTICULAR TUBES

(75) Inventor: Luciano Bertero, Rivalta di Torino (IT)

(73) Assignee: Dayco Fluid Technologies S.p.A., Turin (IT)

( * ) Notice: Subject to any disclaimer, the term of this patent is extended or adjusted under 35 U.S.C. 154(b) by 29 days.

(21) Appl. No.: 09/982,598

(22) Filed: Oct. 17, 2001

(65) Prior Publication Data

US 2002/0084262 A1 Jul. 4, 2002

(30) Foreign Application Priority Data

Oct. 20, 2000 (IT) ......................... TO00A0994

(51) Int. Cl.$^7$ ............................. B29C 35/04; F27B 9/36
(52) U.S. Cl. ....................... 219/388; 219/400; 219/401; 425/526; 425/174.4; 264/675
(58) Field of Search ................. 219/388, 400, 219/401; 264/404, 406, 492, 494, 675; 156/272.2, 275.5; 425/174.4, 526

(56) References Cited

U.S. PATENT DOCUMENTS

| | | | | |
|---|---|---|---|---|
| 3,678,244 A | * | 7/1972 | Worline | ...................... 219/388 |
| 4,147,487 A | * | 4/1979 | Dickson et al. | .............. 425/526 |
| 4,252,753 A | | 2/1981 | Rips | ........................... 264/1.1 |
| 4,321,031 A | * | 3/1982 | Woodgate | ................... 219/388 |
| 4,325,688 A | | 4/1982 | Kumasaka et al. | ......... 425/436 |
| 4,606,723 A | * | 8/1986 | Pasternicki | ................. 219/388 |
| 4,876,434 A | * | 10/1989 | Hanson et al. | .............. 219/388 |
| 5,322,651 A | * | 6/1994 | Emmer | ....................... 425/526 |
| 5,326,258 A | * | 7/1994 | Gittner et al. | .............. 425/526 |
| 5,525,278 A | | 6/1996 | Krosch et al. | ............. 264/45.3 |
| 5,942,142 A | * | 8/1999 | Forney et al. | .............. 219/388 |

FOREIGN PATENT DOCUMENTS

| | | |
|---|---|---|
| FR | 1264975 | 6/1961 |
| FR | 2758492 | 7/1998 |

* cited by examiner

*Primary Examiner*—Joseph Pelham
(74) *Attorney, Agent, or Firm*—Sheridan Ross PC

(57) ABSTRACT

An oven for continuous curing of a succession of pre-formed elastomer articles, in particular tubes, which comprises a curing chamber at atmospheric pressure, communicating with the exterior by means of an intake aperture and an output aperture, a chain, which can advance the pre-formed articles along a closed path, extending through the curing chamber, and a unit for admission of water vapor into the curing chamber in order to keep it saturated with steam.

14 Claims, 4 Drawing Sheets

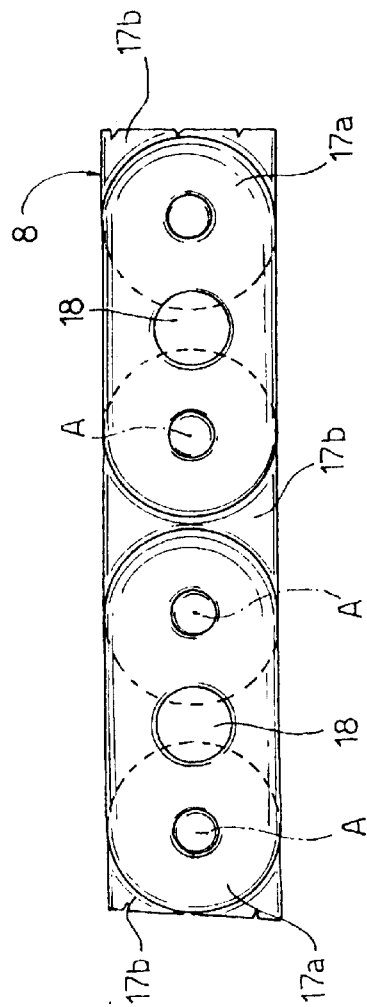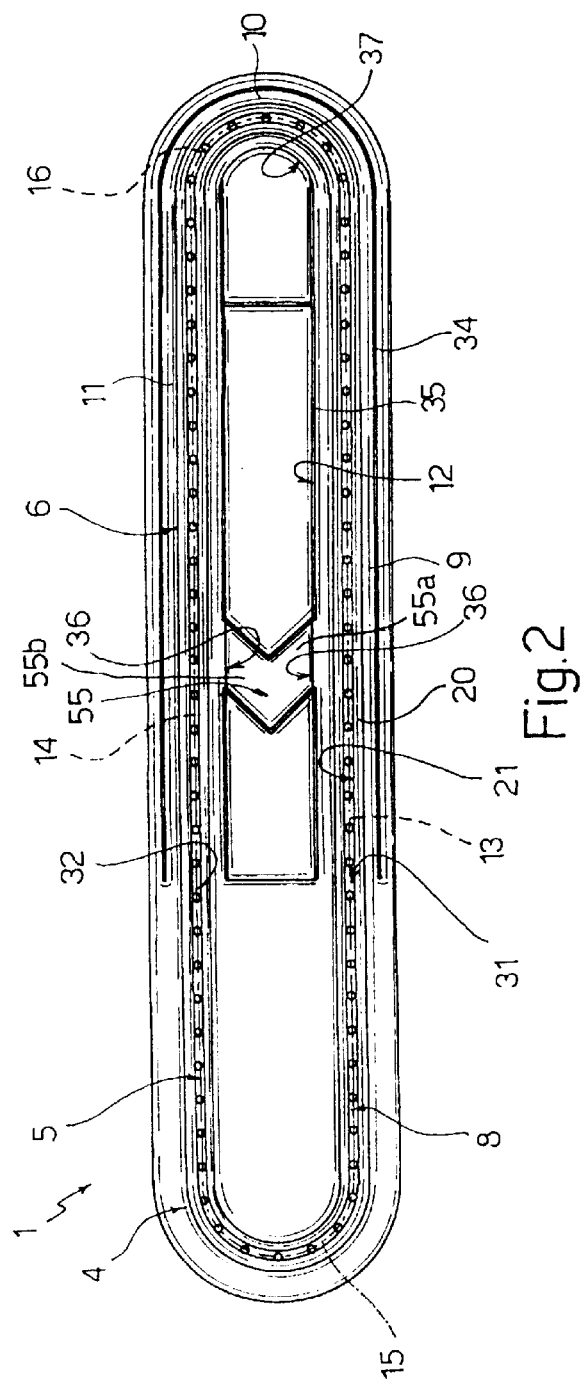

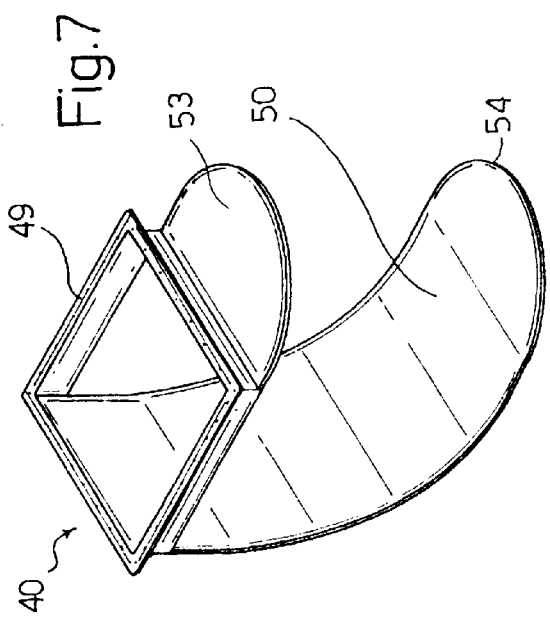
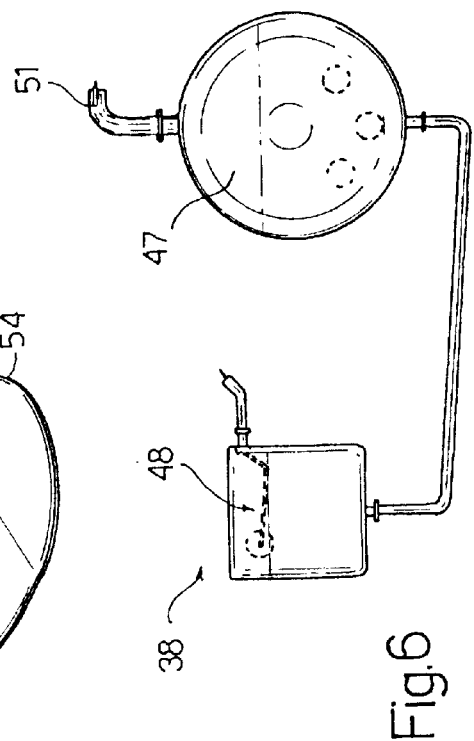
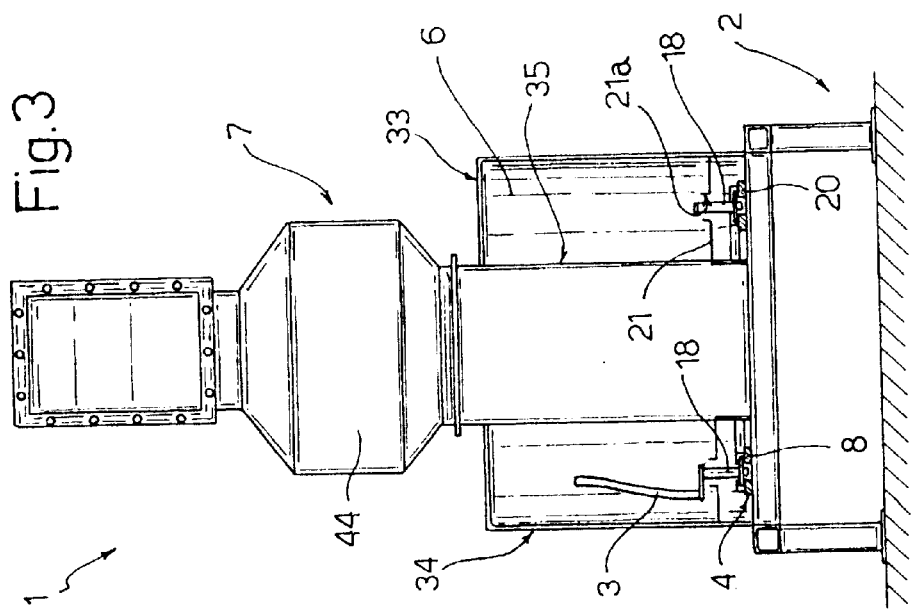

OVEN FOR CONTINUOUS CURING OF A SUCCESSION OF PRE-FORMED ELASTOMER ARTICLES, IN PARTICULAR TUBES

The present invention relates to an oven for continuous curing of a succession of pre-formed elastomer articles, in particular tubes.

In this case, the term "elastomer" should be understood in its broadest sense, of comprising articles which consist of any type of material with an elastomer base, with any type of reinforcement made of textile or of another type.

The term "pre-formed" is understood in this case in the sense of products which, before they are cured, are disposed on suitably shaped supports, such as to assume a shape which is then stabilized by the curing.

BACKGROUND OF THE INVENTION

In general, curing of elastomer tubes which are continuous, and therefore not pre-formed, takes place by means of a discontinuous process, which consists of placing the tube to be cured, which has previously been bound and wound onto a bobbin, inside a curing autoclave, and generating inside the autoclave itself the conditions of temperature and pressure suitable for the curing process. On completion of the curing time, and a period of pause for normalization of the temperature and pressure, the autoclave is opened, and the bobbins are removed; the tube, which is now cured, will then be cut in order to meet the different requirements of use.

Although this process is of a discontinuous type, and therefore has pause times which have a negative impact on the total production time, it nevertheless makes it possible to obtain in a single operation a particularly large quantity of cured product, since a continuous tube can be wound onto a bobbin, and thus occupy a relatively small volume, even if it has a considerable length.

On the other hand, the above-described curing method is particularly disadvantageous in the case of pre-formed elastomer articles, such as pieces of tube which are fitted onto shaped supports, since in addition to the disadvantage of the pause times specific to the discontinuous process, there is that of the limited number of articles which can be loaded in the autoclave, so as to use fully the space available.

Curing ovens are also known which make possible a continuous curing process for continuous elastomer tubes. In particular, the tube to be cured passes continuously through these ovens, which for this purpose have respective input and output apertures for the tube itself, provided with corresponding sealing elements in order to maintain the curing conditions inside the oven, such as the pressure.

It is apparent that, whilst it is possible to produce an intake aperture and an output aperture which are provided with corresponding suitably shaped sealing elements, in order to permit sealed passage of a continuous tube with a substantially constant cross-section, this process becomes particularly complex, if not impossible, in the case of a plurality of pre-formed elastomer articles which advance in succession, and have variable shapes.

SUMMARY OF THE INVENTION

The object of the present invention is to provide an oven for continuous curing of a succession of pre-formed elastomer articles, which can eliminate simply and economically the disadvantages of the above-described known art.

On the basis of the invention, an oven is therefore provided for continuous curing of a succession of pre-formed elastomer articles, in particular tubes, characterized in that it comprises a curing chamber which communicates with the exterior via at least a first and a second aperture, means for admission of water vapour into the said curing chamber, in order to provide conditions of saturation of steam in the curing chamber itself, and means for movement, in order to advance the said pre-formed elastomer articles in succession along a path, which extends at least partially inside the said curing chamber, through the said first and second apertures.

BRIEF DESCRIPTION OF THE DRAWINGS

Further characteristics of the present invention will become apparent from the following description of a non-limiting embodiment, with reference to the attached figures, in which:

FIG. 2 is a cross-section along the line II—II of the oven in FIG. 1;

FIG. 3 is a cross-section along the line III—III of the oven in FIG. 1; and

FIGS. 4 to 8 illustrate respective details of the oven in FIG. 1.

DETAILED DESCRIPTION OF THE INVENTION

Figure 1:
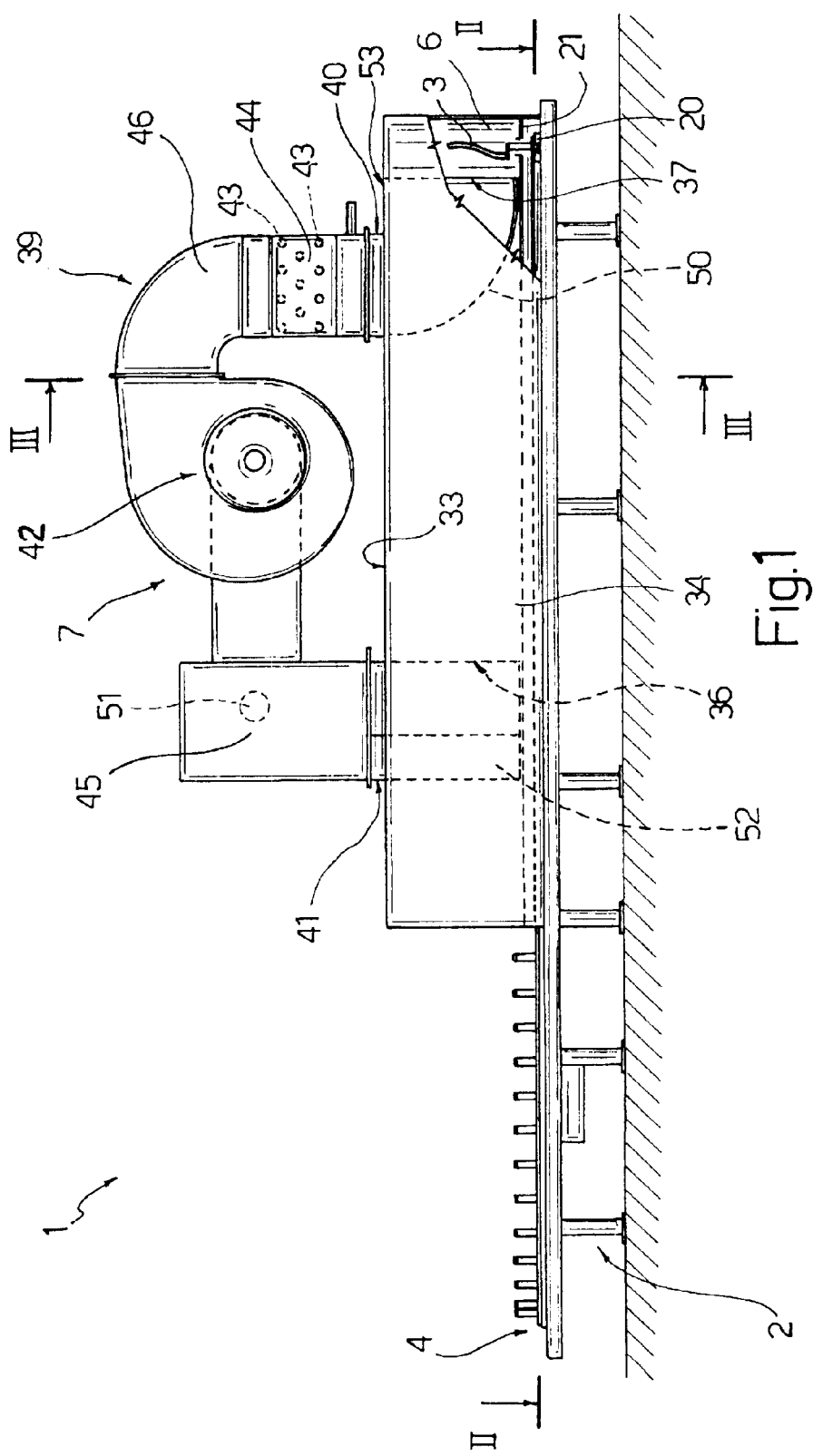
FIG. 1 is a lateral elevated view, and with parts removed for the sake of clarity, of a preferred embodiment of an oven according to the present invention, for continuous curing of a succession of pre-formed elastomer articles.

In FIGS. 1, 2 and 3, 1 indicates as a whole an oven which is supported by a support frame 2, and can cure continuously a succession of pre-formed elastomer articles 3, in this case tubes, which have variable shapes.

The oven 1 substantially comprises a chain-type device for movement 4, and can advance the articles 3 in succession along a path 5, a curing chamber 6, through which there passes a portion of the path 5, and a unit 7 for admission of steam into the curing chamber 6.

The path 5 is closed, and is defined by a pair of respectively outward and return straight branches 13, 14 which are parallel to one another, and by a pair of semicircular sections 15, 16, with ends which connect the sections 13, 14.

The curing chamber 6 is in the shape of a U, and encloses part of the path 5; in particular, the curing chamber 6 comprises a straight intake branch 9, which extends along part of the section 13 of the path 5, a semi-circular intermediate portion 10, which extends along the semi-circular section 16 of the path 5, and a straight output branch 11, which is parallel to the intake branch 9, and extends along part of the section 14 of the path 5. The intake 9 and output 11 branches communicate with the exterior via respective apertures 31 and 32, for intake and output of the articles 3.

The curing chamber 6 is delimited by a flat upper wall 33, by an outer lateral wall 34 which has the shape of a "U" in plan view, and by an inner wall 35, which also has the shape of a "U" in plan view, and is parallel to the outer lateral wall 34. The inner wall 35 has two apertures 36 which are the same and symmetrical, produced respectively in the intake 9 and output 11 portions, and an aperture 37 which corresponds to the intermediate portion 10, the function of which will be described hereinafter. The inner wall 35 delimits externally an inner aperture 12.

Figure 4:
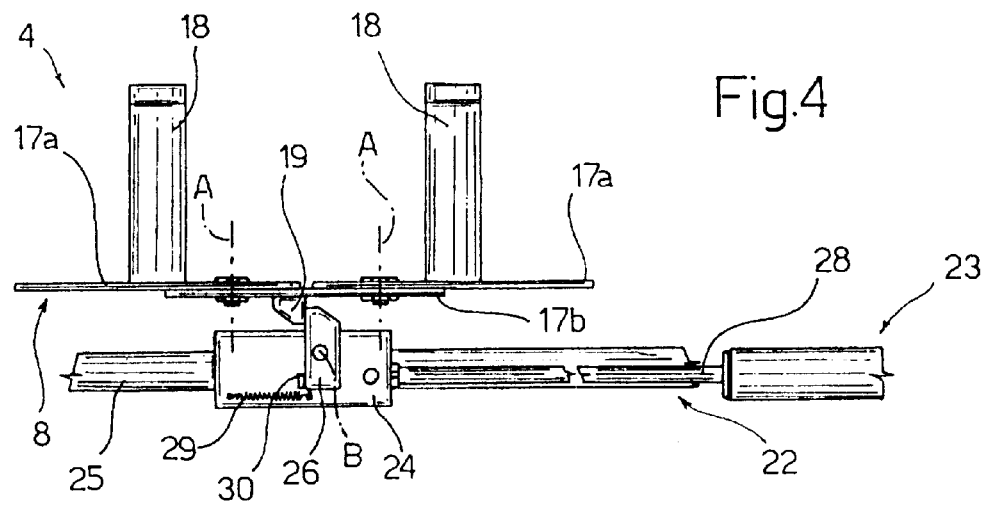

The device for movement 4 comprises a flat chain 8 (FIG. 5), which is mobile along a guide 20, which extends along the path 5, in the vicinity of the base of the curing chamber 6, and a pair of step-type drive devices 22 (FIG. 4).

As illustrated in detail in FIGS. 4 and 5, the chain 8 consists of a plurality of respectively upper and lower full links 17a and 17b, which are disposed alternately on corresponding parallel support planes, and pivot on one another, in order to rotate around respective axes of pivoting A, which are at right-angles to the said planes. In particular, each upper link 17a is pivoted on two lower links 17b, and each lower link 17b is pivoted on two upper links 17a. On each of the upper links 17a, there is secured a vertical part-holder element 18, which extends upwards, on which there can be secured one or more pre-forming and curing mandrels (not illustrated), and on each of the lower links 17b there is secured a nib 19, which extends downwards, and can cooperate with the drive devices 22, as will be described in detail hereinafter.

The chain 8 co-operates substantially in a sealed manner with the guide 20, such as to reduce as far as possible the losses of steam and thermal energy of the curing chamber 6 towards the exterior. For this purpose, the chain 8 is also covered at the top by a fixed shield 21, which has a continuous aperture 21a, which extends along the entire path 5, and from which there project inside the chamber 6 only the part-holder elements 18, which move together with the chain 8 itself.

The two drive devices 22 are disposed respectively along the sections 13, 14 of the path 5, and operate synchronously in steps. As illustrated in FIG. 5, each of the devices 22 comprises a cylinder 23, with a horizontal axis which is parallel to the corresponding section 13, 14 of path of the chain 8, a slide 24, which is mobile with straight motion, which alternates under the thrust of the cylinder 23 itself along a guide 25, and a pawl 26, which is supported by the slide 24, which acts in a one-way manner and sequentially on each of the nibs 19, in order to give rise to advance of the chain 8. The cylinder 23 has a path which is advantageously greater than the pitch of the chain 8, i.e. than the pitch between two consecutive nibs 19. The pawl 26 is pivoted on the slide 24, around a horizontal axis B, at right-angles to the axis of the cylinder 23, and is thrust by a spring 29 against a stop tooth 30, which prevents its rotation, by the effect of contact with a nib 19, during the thrust course of the cylinder 23. During the return course of the cylinder 23, the pawl 26 can rotate against the action of the spring 30, when it strikes against the following nib 19, and can therefore "leapfrog" this nib 19, and become ready for a new thrust step. Thus, at each cycle of the cylinder 23, the chain 8 advances by one step.

The unit 7 for admission of the steam comprises a heating unit 38 for production of the steam, and a re-circulation circuit 39, which is connected to the curing chamber 6 via an admission mouth 40 and a suction mouth 41, both of which are accommodated in the opening 12 formed between the branches 9, 11 of the curing chamber 6, as described hereinafter, and which communicate respectively with the apertures 36 and with the aperture 37.

The re-circulation circuit 39 comprises a fan 42, which can suck up the steam from a suction plenum 45, which is connected to the curing chamber 6 via the suction mouth 41, and can admit the steam into the curing chamber 6 itself via the admission mouth 40, and a heater 44, which for example is provided with a set of electrical resistors 43, disposed between the fan 42 and the admission mouth 40, in order to superheat the steam before it is admitted into the curing chamber 6.

The heating unit 38, which is illustrated in FIG. 6, is connected to the suction plenum 45 by a pipe 51, and generates water vapour in the nascent state, which is admitted into the re-circulation circuit 39 by means of the suction pressure generated by the fan 42. In particular, the heating unit 38 comprises a boiler 47 and a level regulator 48, which for example is of the float type, and can guarantee a predetermined level of water inside the boiler 44 itself.

The admission mouth 40 faces the interior of the intermediate portion 10 of the curing chamber 6, via the aperture 37 in the inner lateral wall 35, and, as illustrated in FIG. 7, comprises a substantially square upper flange 49, which is secured to the recirculation pipe 39, a flat upper wall 53, which extends from one side of the flange 49, and faces the intermediate portion 10 of the curing chamber 6, and is substantially in the shape of a semi-circle, such as to co-operate in a sealed manner with an inner edge of the upper wall 33, delimiting the aperture 37 at the top, and a lower wall 50. The latter extends downwards from a side opposite the flange 49, and curves progressively towards a lower edge of the aperture 37 of the inner lateral wall 35, with which it co-operates in a sealed manner with its own semi-circular front edge 54. The lateral edges of the lower wall 50 are secured in a sealed manner to the inner lateral wall 35.

Figure 8:
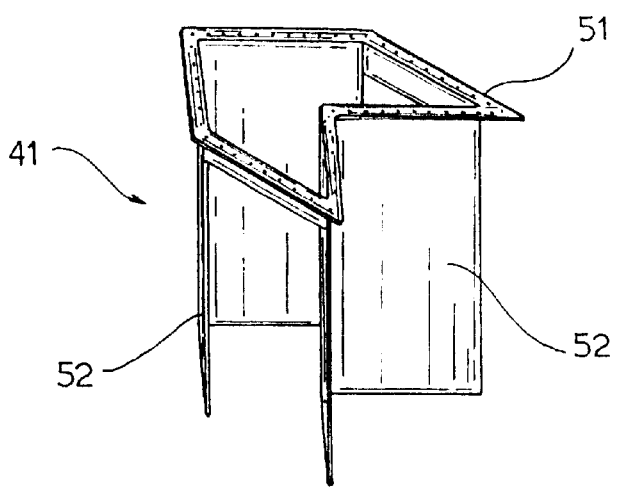

The suction mouth 41 is disposed in the opening 12, at the two apertures 36 in the wall 15, and, as illustrated in FIG. 8, comprises an upper flange 51, for connection to the re-circulation circuit 39, and a pair of shaped walls 52, which extend downwards from opposite sides of the flange 51, which have in plan view a profile in the shape of a "V", and have their own lateral edges each secured in a sealed manner to respective vertical edges of the apertures 36. The two walls 52 delimit a chamber 55, which has a cross-section in the shape of a V defined by a pair of branches 55a, 55b, which are inclined towards the intermediate portion 10 of the curing chamber 6, such as to suck up via the respective apertures 36 substantially only steam which is contained in the curing chamber 6, and to minimize the suction of air from the exterior.

In use, when the oven is started up, the curing chamber 6 is full of air. The steam generated by the heating unit 38 is admitted into the curing chamber 6 by the fan 42, and saturates the environment, progressively replacing the air. The fan 42, which advantageously has a high capacity and a low number of revolutions, maintains a high speed of flow in the curing chamber 6; the curing chamber 6 is maintained substantially at ambient pressure, and, advantageously, at least in the vicinity of the intake 31 and output 32 apertures, it is maintained with slight suction pressure, such as to minimize the losses of steam and thermal energy towards the exterior.

When the curing chamber is saturated with steam, the operating cycle can begin. The portion 15 of the path 5 outside the curing chamber 6 is used for loading and unloading of the parts, onto and from the chain 8. The process is continuous, and the average speed of advance of the chain 8, i.e. the pace of actuation of the cylinders 23 of the devices 22, is calculated such as to assure that the parts remain in the curing chamber 6 for the time necessary in order to complete the curing. The parts, which for example are pieces of tube made of non-cured or pre-cured elastomer material, are fitted by an operator onto pre-forming mandrels, which substantially consist of shaped bars, secured to the part-holders 18. The tubes are removed from the mandrels at the output from the curing chamber 6, and retain the shape assumed.

The sealing towards the base in the curing chamber 6 is assured by the chain 8 itself, which is produced with full, flat links, such as to co-operate substantially in a sealed manner with the guide 20.

The use of an environment which is saturated with water vapour permits curing which is substantially at ambient pressure, and thus does not have any particular problems of sealing at the intake and at the output of the curing chamber 6. The water vapour has a dual action, i.e. it assists thermal exchange with the parts, owing also to a phenomenon of instantaneous condensation of the steam on the "cold" parts at the intake of the curing chamber 6; in addition, owing to the substantial lack of air, chemical reactions between the oxygen and the components of the mixture are avoided.

Finally, it is apparent that modifications and variations which do not depart from the scope of protection of the claims can be made to the oven provided according to the present invention.

In particular, at the output of the curing chamber 6, a system can be provided for forced cooling of the cured parts, for example by means of air or sprinkling.

In addition, the heating unit 38 could be replaced by any other source of steam, for example by a steam distribution network, if this is available in the factory.

I claim:

1. An oven for continuous curing of a succession of pre-formed elastomer articles in particular tubes comprising a curing chamber which communicates with the exterior by means of at least one first and one second aperture means for admission of water vapor into said curing chamber in order to provide conditions of saturation of steam in the curing chamber itself, and means for movement in order to advance said pre-formed elastomer articles in succession along a path which extends at least partially inside said curing chamber via said first and second apertures.

2. An oven according to claim 1 wherein said unit for admission of steam comprises means for generation of steam, a re-circulation circuit which is connected to said means for generation of steam and communicates with said curing chamber via an admission mouth for the steam, and a suction mouth for the steam.

3. An oven according to claim 2 wherein said re-circulation circuit comprises a fan which is connected to means for heating of the steam disposed between said fan and said admission mouth.

4. An oven for curing according to claim 1 wherein said path is closed and comprises a first straight outward section a second return section which is parallel to said first straight outward section, and a pair of curved end sections which connect corresponding opposite ends of said first and second sections.

5. An oven for curing according to claim 4 wherein said curing chamber is in the shape of a "U", extending along said closed path and comprises a straight intake branch which extends along part of said first section, an intermediate portion which extends along one of said curved sections of said path, and a straight output branch which is parallel to said intake branch and extends along part of said second section of said path, said intake and output branches communicating with the exterior via respective apertures for intake and output of said articles.

6. An oven according to claim 5 wherein said admission mouth is connected to said curing chamber via an aperture which communicates with said intermediate portion of said curing chamber.

7. An oven according to claim 5 wherein said suction mouth is connected to said curing chamber via a pair of apertures which communicate with respective intake and output branches of said curing chamber.

8. An oven according to claim 7 wherein said suction mouth defines a chamber which comprises a pair of branches which are connected via said pair of apertures to the respective said intake and output branches of said curing chamber and are inclined towards said intermediate portion of said curing chamber.

9. An oven according to claim 1 wherein said means for movement comprise a chain which extends along said path.

10. An oven according to claim 9 wherein said chain is formed from a plurality of full flat respectively upper and lower links which alternate and are pivoted on one another, said chain sliding along a guide which extends in the vicinity of the base of said curing chamber and co-operating substantially in a sealed manner with said guide.

11. An oven according to claim 10 wherein each of said upper links comprises a secured vertical part-holder element which extends upwards and on each of said lower links comprises a secured drive element which extends downwards.

12. An oven according to claim 11 wherein said means for advance comprise at least one step-type drive device which acts on said drive elements of said chain.

13. An oven according to claim 12 wherein said step-type drive device comprises a pneumatic cylinder and thrust means which are mobile alternately under the thrust of said cylinder in order to co-operate sequentially and in a one-way manner with each of said drive elements.

14. An oven according to claim 3 wherein said means for heating comprise a set of electrical resistors.

* * * * *